(12) United States Patent
Jones et al.

(10) Patent No.: US 8,424,676 B2
(45) Date of Patent: Apr. 23, 2013

(54) COMPOUND SPROCKET FOR CONVEYOR BELT

(75) Inventors: Chetwyn Jones, Cambridge, MD (US); George Howard Messick, Jr., East New Market, MD (US)

(73) Assignee: Cambridge International, Inc., Cambridge, MD (US)

( * ) Notice: Subject to any disclaimer, the term of this patent is extended or adjusted under 35 U.S.C. 154(b) by 267 days.

(21) Appl. No.: 12/763,834

(22) Filed: Apr. 20, 2010

(65) Prior Publication Data
US 2010/0263992 A1  Oct. 21, 2010

Related U.S. Application Data

(60) Provisional application No. 61/202,923, filed on Apr. 20, 2009.

(51) Int. Cl.
*B65G 23/06* (2006.01)
(52) U.S. Cl.
USPC .......................................................... 198/834
(58) Field of Classification Search ................ 198/832, 198/834, 835; 474/47, 48, 50, 54, 55
See application file for complete search history.

(56) References Cited

U.S. PATENT DOCUMENTS

| | | | | |
|---|---|---|---|---|
| 597,914 | A | * | 1/1898 | Richards ........................ 474/47 |
| 601,990 | A | * | 4/1898 | Suter ............................. 474/47 |
| 697,577 | A | * | 4/1902 | Wangerin ....................... 474/47 |
| 2,000,072 | A | * | 5/1935 | Gedstad ......................... 37/390 |
| 2,575,582 | A | * | 11/1951 | Chamberlain .................. 474/47 |
| 5,203,861 | A | * | 4/1993 | Irwin et al. .................... 474/161 |
| 5,375,695 | A | | 12/1994 | Daringer et al. |
| 5,427,580 | A | * | 6/1995 | Ledvina et al. ................. 474/84 |
| 5,479,223 | A | * | 12/1995 | McLendon et al. ............ 352/79 |
| 5,590,755 | A | | 1/1997 | Daringer et al. |
| 5,816,988 | A | | 10/1998 | Daringer et al. |
| 6,041,916 | A | | 3/2000 | Daringer et al. |
| 6,050,394 | A | | 4/2000 | Daringer et al. |
| 6,161,512 | A | * | 12/2000 | Beels Van Heemstede ................. 123/90.31 |
| 7,210,573 | B2 | * | 5/2007 | Mol .............................. 198/847 |

(Continued)

FOREIGN PATENT DOCUMENTS

EP  0 027 167 A1  4/1981

OTHER PUBLICATIONS

Search Report dated Jan. 3, 2011, issued by the Korean Patent Office in corresponding International patent application No. PCT/US2010/001168.

*Primary Examiner* — Gene Crawford
*Assistant Examiner* — Keith R Campbell
(74) *Attorney, Agent, or Firm* — Buchanan Ingersoll & Rooney PC

(57) ABSTRACT

A compound sprocket having at least one rotatable member including an outer sprocket element and an inner sprocket element symmetrically disposed relative to a central axis of rotation of the at least one rotatable member. The outer sprocket element includes a plurality of spaced, uniformly radially-oriented protrusions on an outer cylindrical surface thereof for engaging a conveyor belt, the outer sprocket element further includes a plurality of pockets formed on an inner cylindrical surface thereof. The inner sprocket element has a plurality of protrusions corresponding in number and position to the pockets formed on the inner cylindrical surface of the outer sprocket element and received therein. A resilient connecting element is disposed in each pocket biased between a wall of the pocket of the outer sprocket element and one of the protrusions of the inner sprocket element.

21 Claims, 4 Drawing Sheets

U.S. PATENT DOCUMENTS

2002/0117382 A1 8/2002 Maine, Jr.
2003/0089583 A1* 5/2003 Depaso et al. ................ 198/834
2007/0039528 A1 2/2007 Sauder et al.
2008/0011586 A1* 1/2008 Kanaris ........................ 198/834

* cited by examiner

COMPOUND SPROCKET FOR CONVEYOR BELT

FIELD OF THE INVENTION

The present invention is directed to a rotatable member for a conveyor belt, more particularly to a compound drive roll or sprocket member configured to distribute the tension load of a conveyor belt across the width thereof.

BACKGROUND OF THE INVENTION

FIG. 1 illustrates a conventional sprocket for a conveyor belt having rows 28, 30, 32, 34 of protrusions 36 machined to provide a plurality of protrusions on the cylindrical surface 40 of sprocket 26. Surface 40 is substantially cylindrical in relation to a central axis of rotation of sprocket 26 and the protrusions are machined to project radially from that surface. The protrusions 36 are machined on the surface of the drive roll or sprocket 26 so as to interfit with confronting surface openings of the conveyor belt. The number of protrusions selected across the sprocket width is selected to provide a substantially uniform drive across the width of the belt. Additional information concerning drive systems for conveyor belts is disclosed in U.S. Pat. Nos. 5,375,695, 5,590,755, 5,816,988, 6,050,394, and 6,041,916, the entire content of each being incorporated herein by reference.

While the drive rolls or sprockets discussed above are intended to provide for uniform drive across the belt width and increased widthwise dimensional drive contact, there still exists a need for improvement in this regard.

SUMMARY OF THE INVENTION

These and other objects are met by a conveyor system comprising at least one rotatable member including an outer sprocket element and an inner sprocket element symmetrically disposed relative to a central axis of rotation of said member. The outer sprocket element having a plurality of spaced, uniformly radially-oriented protrusions on an outer cylindrical surface thereof for engaging said conveyor belt and a plurality of pockets formed on an inner cylindrical surface thereof. The inner sprocket element also having a plurality of protrusions corresponding in number and position to the pockets formed in the outer sprocket element. A resilient connecting element, such a spring, is disposed in each pocket biased between a wall of the outer sprocket element and a protrusion of the inner sprocket element.

BRIEF DESCRIPTION OF THE DRAWING FIGURES

These and other objects, features, and advantages of the present invention will become more readily apparent to those skilled in the art upon reading the following detailed description, in conjunction with the appended drawings in which.

DETAILED DESCRIPTION OF THE INVENTION

Figure 1:
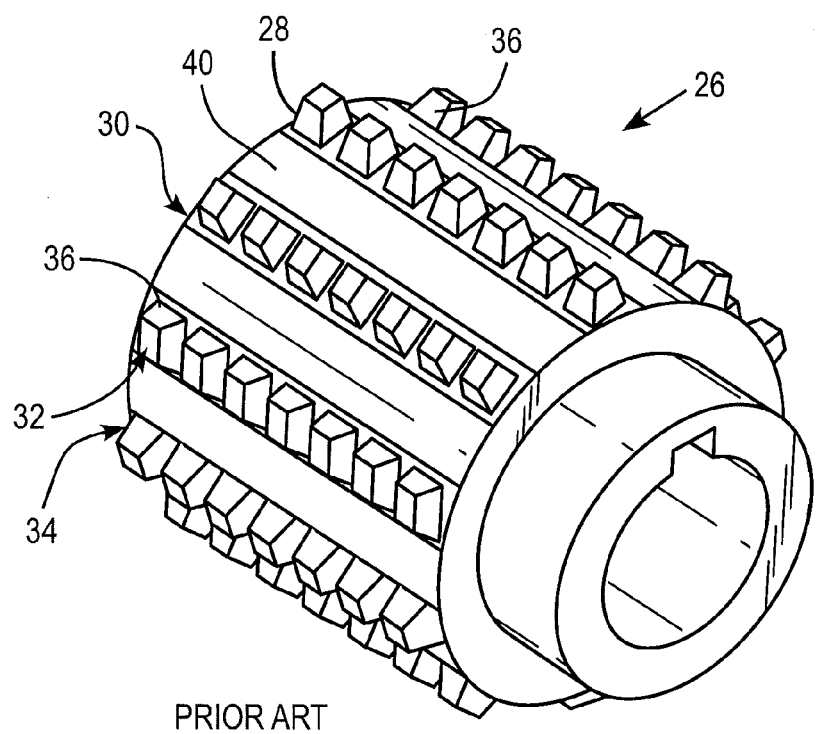
FIG. 1 is a perspective view of a conventional sprocket for driving a conveyor belt.
Figure 3:
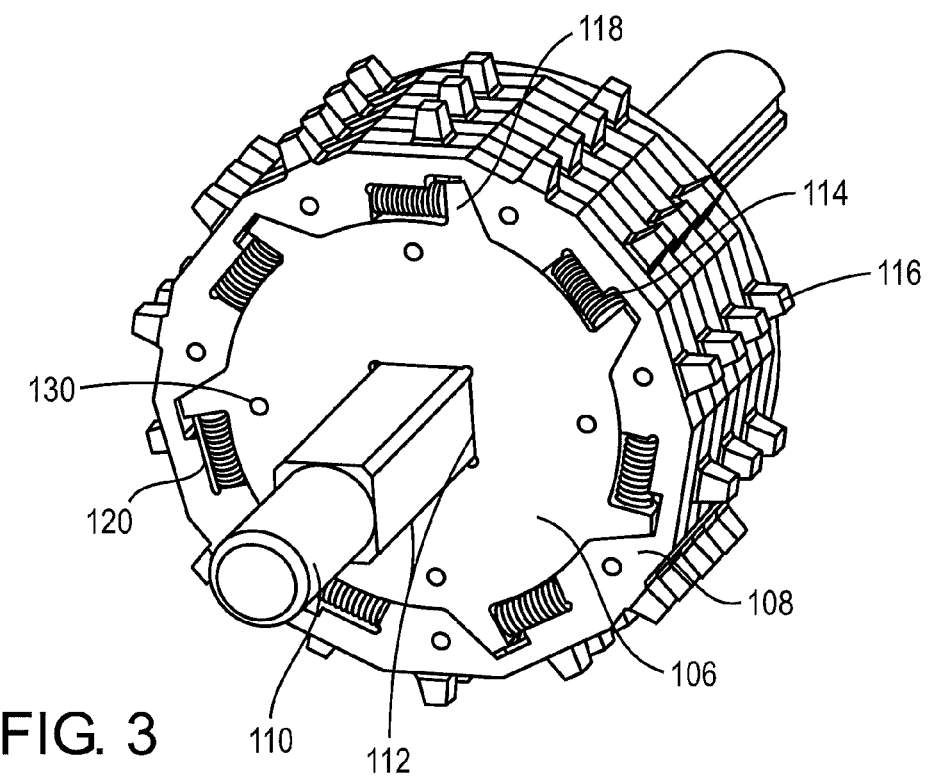
FIG. 3 is a perspective view of the compound sprocket with the end plates removed.
Figure 2:
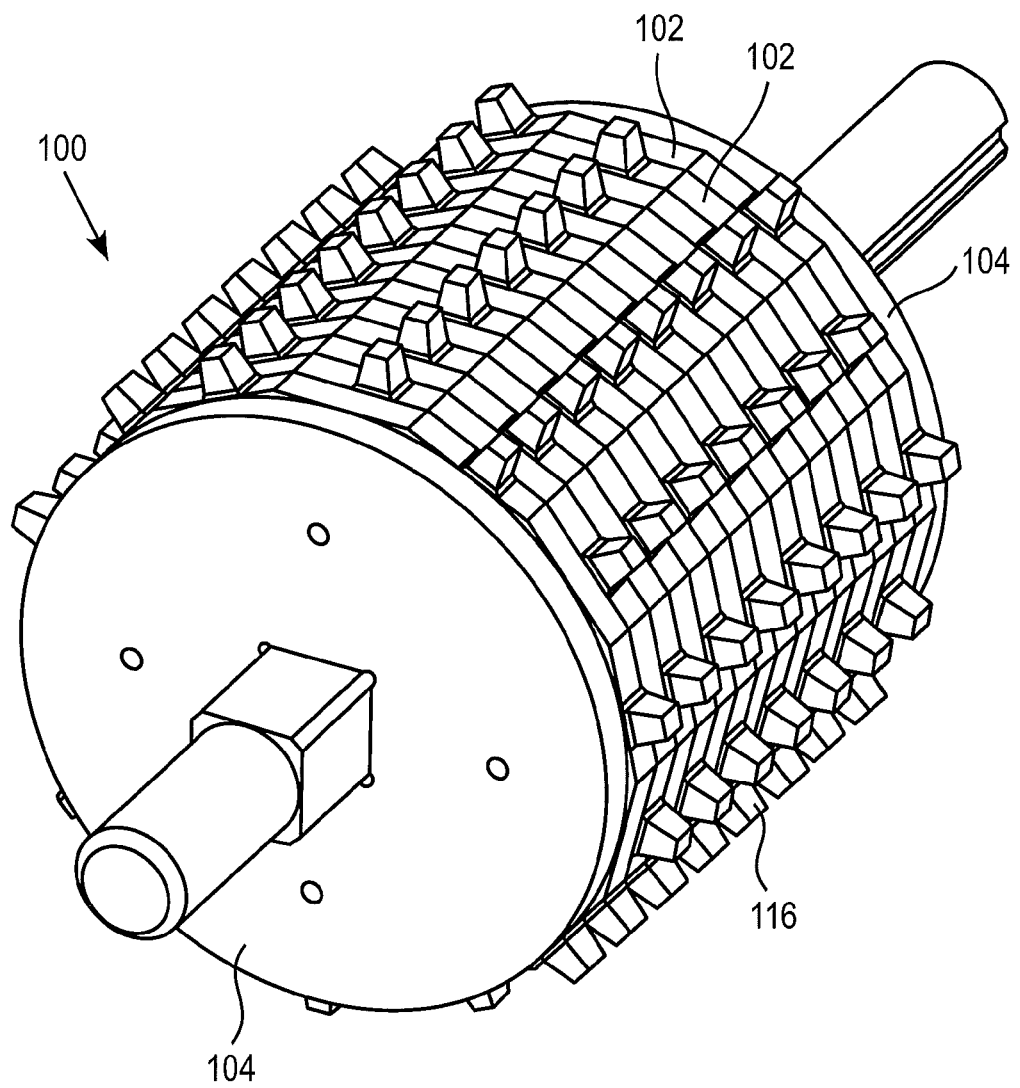
FIG. 2 is a perspective view of a compound sprocket for a conveyor belt according to a preferred embodiment of our invention.

A compound drive roll or sprocket for use with a conveyor belt in accordance with the present invention is shown generally in FIGS. 2 and 3 by reference numeral 100. Compound sprocket 100 includes a plurality of compound sprocket elements 102 aligned in a predetermined side-by-side configuration and held by end plates 104. Each compound sprocket element 102 includes an inner sprocket member 106 and an outer sprocket member 108. The inner sprocket member 106 is timed to a drive shaft 110 by a square bore 112, keyway, or other mounting means. The outer sprocket member 108 is allowed to shift around the circumference of the inner sprocket member 106 by way of a plurality of resilient connecting elements 114, as described in greater detail below. The compound sprocket elements 102 are arranged to form a compound sprocket 100, the width of which will vary depending on the width of the intended conveyor belt. The inner sprocket members 106 will be timed and compressed together by threaded rods 130 which run down the width of the compound sprocket 100 and are secured with a fastener (not shown).

The compound sprocket 100 includes a plurality of teeth 116 for engaging a conveyor belt, as known in the art and described more fully, for example, in U.S. Pat. No. 6,041,916. A link 122 of one possible conveyor belt is shown in engagement with the compound sprocket element 102 in FIGS. 4 and 5. Link 122 forms a modular conveyor belt as described in U.S. Patent Publication No. 2002/0117382, the contents of which are hereby incorporated by reference, but other types of conveyor belts can of course also be utilized with compound sprocket 100, as will be appreciated by one skilled in the art. As shown in FIG. 2, the teeth 116 are formed on the outermost periphery of the outer sprocket member 108. The inner sprocket member 106, however, also includes a plurality of radially extending protrusions 118 disposed about the periphery thereof, as shown in FIG. 3.

Figure 4:
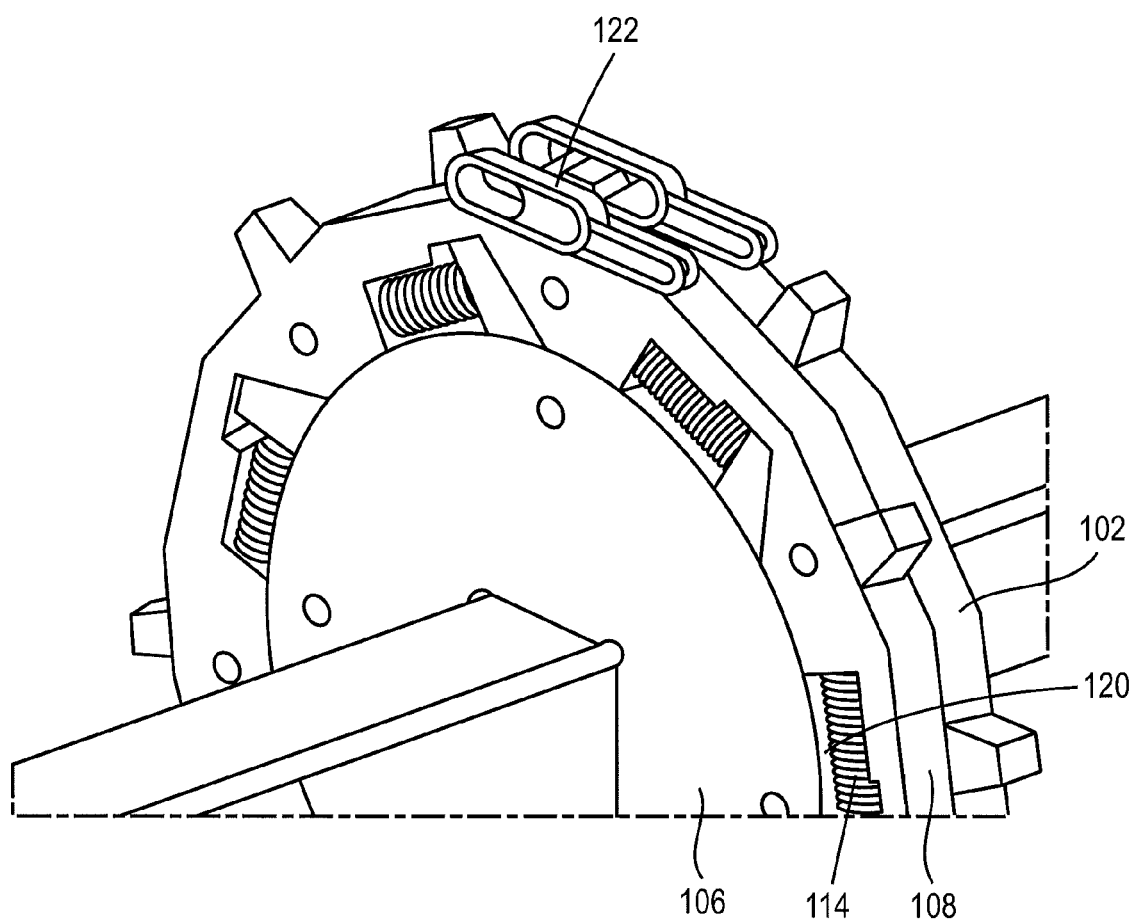
FIG. 4 is a perspective view of two compound sprocket elements being assembled into the compound sprocket shown in FIG. 2, with a conveyor belt link positioned thereon.
Figure 5:
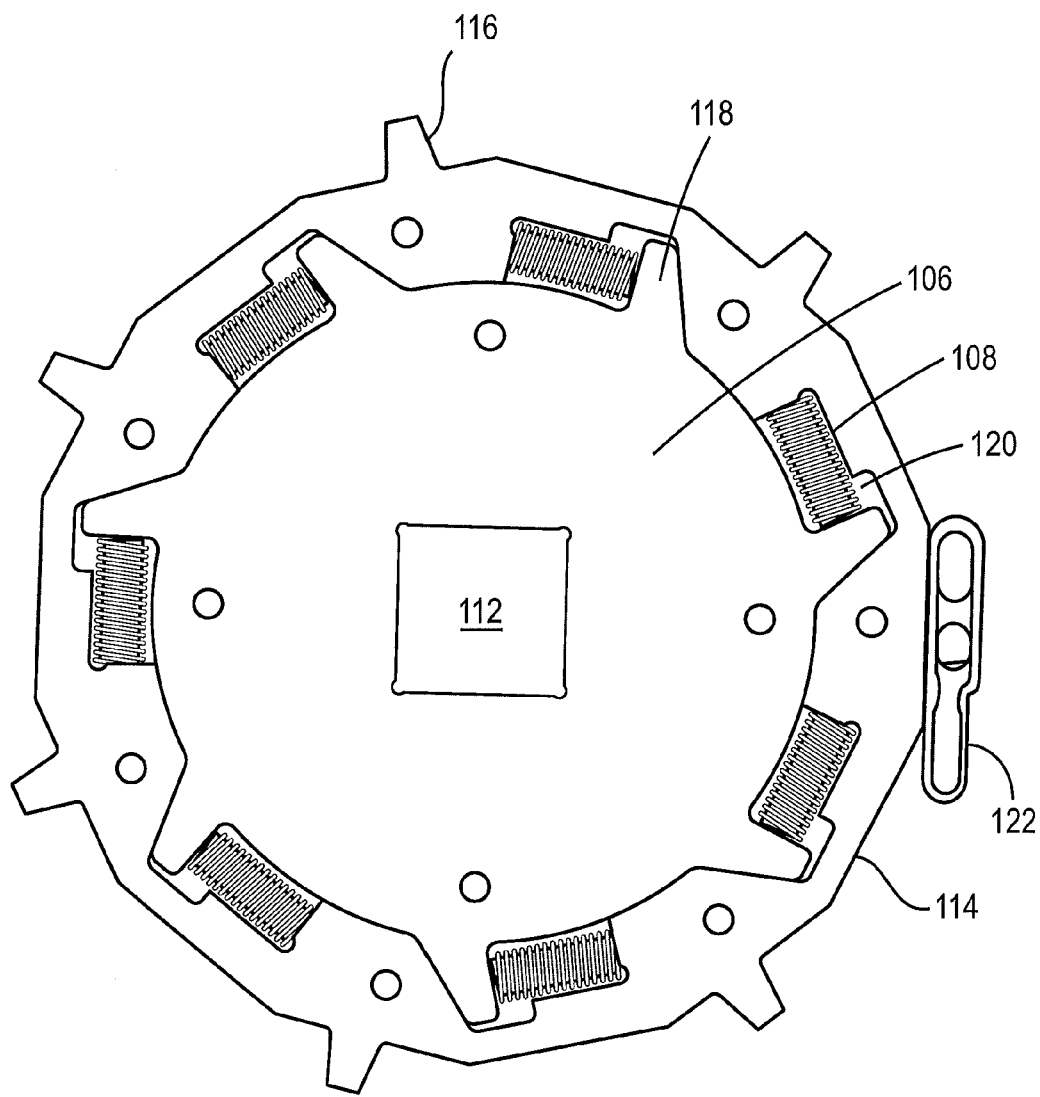
FIG. 5 is a side elevational view of the compound sprocket element shown in FIG. 4.

Referring also to FIGS. 4 and 5, a pocket 120 is formed in the innermost periphery of the outer sprocket member 108, preferably by machining. The pocket 120 receives a corresponding protrusion 118 of the inner sprocket member 106 and allows insertion of a resilient connecting element 114, such as a spring. The spring 114 is thus biased between the wall of the outer sprocket member 108 and the protrusion 118 so as to vary the force required to shift the outer sprocket member 108 relative to the inner sprocket member 106. The spring can be varied for different load situations and response times. When the outer sprocket members 108 shift, they allow adjacent sprocket elements 102 to receive a portion of the load. Tension in the conveyor belt will thus be more evenly loaded across the width of the conveyor belt and sharing the tension loading will increase the conveyor belt strength and life.

The above-described compound sprocket configuration is ideally suited for a plastic construction, such as from Dekin® acetal resin. Other plastic materials which could also be used include, for example, PET, PBT, acetal, Ultem® (polyethermide), and nylon. The same configuration may also be used for constructing the compound sprocket from stainless steel, metal or ceramic materials, or any other desired material, as would be appreciated by one skilled in the art.

Although certain preferred embodiments of the present invention have been shown and described in detail, it should be understood that various changes and modifications may be made therein without departing from the scope of the appended claims.

The invention claimed is:

1. A compound sprocket comprising:
   at least one rotatable member including an outer sprocket element and an inner sprocket element symmetrically disposed relative to a central axis of rotation of said at least one rotatable member;
   said outer sprocket element including a plurality of spaced, uniformly radially-oriented teeth on an outer cylindrical surface thereof for engaging a conveyor belt, said outer sprocket element further including a plurality of pockets formed on an inner cylindrical surface thereof;
   said inner sprocket element having a plurality of protrusions on an outer cylindrical surface thereof, said protrusions corresponding in number and position to said pockets formed on said inner cylindrical surface of said outer sprocket element and received therein; and
   a plurality of resilient connecting elements corresponding in number to said plurality of pockets, only one said resilient connecting element disposed in each said pocket and biased between a wall of said pocket of said outer sprocket element and one of said protrusions of said inner sprocket element.

2. The compound sprocket according to claim 1, wherein said resilient connecting element comprises a spring having a spring force.

3. The compound sprocket according to claim 2, wherein said spring force varies dependent upon load and response time so as to vary a force required to shift the outer sprocket member relative to the inner sprocket element.

4. The compound sprocket according to claim 1, wherein said at least one rotatable member comprises a plurality of rotatable members, said plurality of rotatable members being aligned in a predetermined side-by-side configuration and secured by opposing end plates.

5. The compound sprocket according to claim 1, wherein said at least one rotatable member is formed from a plastic material.

6. The compound sprocket according to claim 5, wherein said plastic material is selected from the group consisting of DELRIN, acetal resin, PET, PBT, acetal, polyethermide and nylon.

7. The compound sprocket according to claim 1, wherein said at least one rotatable member is formed from stainless steel.

8. The compound sprocket according to claim 1, wherein said pocket formed on the inner cylindrical surface of said outer sprocket element is defined by opposing first and second radial wall surfaces and a circumferal wall surface extending therebetween.

9. The compound sprocket according to claim 8, wherein said circumferal wall surface includes a first wall portion radially spaced a first distance from the inner cylindrical surface of said outer sprocket element, a second wall portion radially spaced a second distance from the inner cylindrical surface of said outer sprocket element, and a radial transition wall surface extending between the first wall portion and the second wall portion, the second distance being greater than the first distance such that said pocket includes a first pocket area having a first depth relative to the inner cylindrical surface of said outer sprocket element and a second pocket area having a second depth relative to the inner cylindrical surface of said outer sprocket element wherein the second depth is greater than the first depth.

10. The compound sprocket according to claim 9, wherein said protrusion of said inner sprocket element is received in said second pocket area and said resilient connecting element is laterally disposed in said first pocket area between said first radial wall surface of said pocket and said protrusion, wherein said second pocket area is configured to allow movement of said protrusion within said second pocket area, said protrusion contacting said second radial wall surface of said pocket in a first position when said resilient connecting element is extended and said protrusion contacting said radial transition wall surface when said resilient connecting element is compressed, thereby allowing for movement of said inner sprocket element relative to said outer sprocket element.

11. A conveyor system comprising;
    a conveyor belt; and
    a compound sprocket, said compound sprocket including:
       at least one rotatable member including an outer sprocket element and an inner sprocket element symmetrically disposed relative to a central axis of rotation of said at least one rotatable member;
       said outer sprocket element including a plurality of spaced, uniformly radially-oriented teeth on an outer cylindrical surface thereof for engaging said conveyor belt, said outer sprocket element further including a plurality of pockets formed on an inner cylindrical surface thereof;
       said inner sprocket element having a plurality of protrusions on an outer cylindrical surface thereof, said protrusions corresponding in number and position to said pockets formed on said inner cylindrical surface of said outer sprocket element and received therein; and
       a plurality of resilient connecting elements corresponding in number to said plurality of pockets, only one said resilient connecting element disposed in each said pocket and biased between a wall of said pocket of said outer sprocket element and one of said protrusions of said inner sprocket element.

12. The conveyor system according to claim 11, wherein said resilient connecting element comprises a spring having a spring force.

13. The conveyor system according to claim 12, wherein said spring force varies dependent upon load and response time so as to vary a force required to shift the outer sprocket member relative to the inner sprocket element.

14. The conveyor system according to claim 11, wherein said at least one rotatable member comprises a plurality of rotatable members, said plurality of rotatable members being aligned in a predetermined side-by-side configuration and secured by opposing end plates.

15. The conveyor system according to claim 11, wherein said conveyor belt and said compound sprocket are formed from a plastic material.

16. The conveyor system according to claim 15, wherein said conveyor belt is a modular conveyor belt.

17. The conveyor system according to claim 11, wherein said pocket formed on the inner cylindrical surface of said outer sprocket element is defined by opposing first and second radial wall surfaces and a circumferal wall surface extending therebetween.

18. The conveyor system according to claim 17, wherein said circumferal wall surface includes a first wall portion radially spaced a first distance from the inner cylindrical surface of said outer sprocket element, a second wall portion radially spaced a second distance from the inner cylindrical surface of said outer sprocket element, and a radial transition wall surface extending between the first wall portion and the second wall portion, the second distance being greater than the first distance such that said pocket includes a first pocket area having a first depth relative to the inner cylindrical surface of said outer sprocket element and a second pocket area having a second depth relative to the inner cylindrical surface of said outer sprocket element wherein the second depth is greater than the first depth.

19. The conveyor system according to claim 18, wherein said protrusion of said inner sprocket element is received in said second pocket area and said resilient connecting element is laterally disposed in said first pocket area between said first radial wall surface of said pocket and said protrusion, wherein said second pocket area is configured to allow movement of said protrusion within said second pocket area, said protrusion contacting said second radial wall surface of said pocket in a first position when said resilient connecting element is extended and said protrusion contacting said radial transition wall surface when said resilient connecting element is compressed, thereby allowing for movement of said inner sprocket element relative to said outer sprocket element.

20. The compound sprocket according to claim 1, wherein said inner cylindrical surface of said outer sprocket element concentrically adjoins said outer cylindrical surface of said inner sprocket element such that said outer sprocket element is allowed to shift around a circumference of said inner sprocket element.

21. The conveyor system according to claim 11, wherein said inner cylindrical surface of said outer sprocket element concentrically adjoins said outer cylindrical surface of said inner sprocket element such that said outer sprocket element is allowed to shift around a circumference of said inner sprocket element.

* * * * *